United States Patent
Mattaway et al.

(10) Patent No.: US 6,275,490 B1
(45) Date of Patent: Aug. 14, 2001

(54) METHOD AND APPARATUS FOR ESTABLISHING COMMUNICATIONS FROM BROWSER APPLICATION

(75) Inventors: Shane D. Mattaway, Boca Raton; Glenn W. Hutton, Miami; Bradley D. Noe, Boca Raton; Steven M. Hancock, Boca Raton; Mark A. Pietras, Boca Raton, all of FL (US)

(73) Assignee: NetSpeak Corporation, Boca Raton, FL (US)

( * ) Notice: Subject to any disclaimer, the term of this patent is extended or adjusted under 35 U.S.C. 154(b) by 0 days.

(21) Appl. No.: 08/915,034

(22) Filed: Aug. 20, 1997

Related U.S. Application Data (60) Provisional application No. 60/024,251, filed on Aug. 21, 1996.

(51) Int. Cl.[7] .................... H04L 12/66; G06F 15/16; G06F 15/00
(52) U.S. Cl. .................. 370/352; 370/401; 379/93.17; 707/104; 707/513; 709/249
(58) Field of Search .................... 370/352, 354, 370/353, 389, 401, 355, 356, 410, 427; 379/93.17, 93.24; 713/201; 707/3, 513, 104; 711/200, 249; 709/239, 245, 250, 205, 218; 345/331

(56) References Cited

U.S. PATENT DOCUMENTS

| 4,899,333 | * | 2/1990 | Roediger | 370/427 |
| 5,771,355 | * | 6/1998 | Kuzma | 709/245 |
| 5,867,665 | * | 2/1999 | Butman et al. | 709/239 |
| 5,884,035 | * | 3/1999 | Butman et al. | 345/331 |
| 5,903,721 | * | 5/1999 | Sixtus | 713/201 |
| 5,903,723 | * | 6/1998 | Beck et al. | 709/205 |
| 6,065,048 | * | 5/2000 | Highley | 709/218 |

* cited by examiner

Primary Examiner—Alpus H. Hsu
Assistant Examiner—Afsar M. Qureshi
(74) Attorney, Agent, or Firm—Kudirka & Jobse, LLP (57) ABSTRACT

A technique for initiating communications from a web browser to a destination on either a packet-switched data network or a circuit-switched communication network includes a communication utility capable of interacting with a browser utility and responsive to address information obtained from a website for establishing a communication link with the website with the other destination defined by the address information. In one embodiment, the address information may comprise either an Internet protocol address, an E-mail address, or a traditional telephone number. The communication utility further enables sharing of URL data so that once a communication link is established, the parties may examine the same website pages simultaneously while communicating over a point-to-point communication link.

20 Claims, 4 Drawing Sheets

METHOD AND APPARATUS FOR ESTABLISHING COMMUNICATIONS FROM BROWSER APPLICATION

RELATED APPLICATIONS

This application claims priority to United States Provisional Patent Application 60/024,251 entitled System and Methods for Point-to-Point Communications over a Computer Network by Mattaway et. al., filed Aug. 21, 1996.

In addition, the subject matters of the following related copending applications are incorporated herein by reference:

U.S. patent application Ser. No. 08/533,115 entitled Point-to-Point Internet Protocol, by Glenn W. Hutton, filed Sep. 25, 1995;

U.S. patent application Ser. No. 08/719,894, entitled Directory Server For Providing Dynamically Assigned Network Protocol Addresses, by Mattaway et al., filed Sept. 25, 1996;

U.S. patent application Ser. No. 08/721,316, entitled Graphic User Interface For Internet Telephony Application, by Mattaway et al., filed Sep. 25, 1996;

U.S. patent application Ser. No. 08/719,891, entitled Method And Apparatus For Distribution And Presentation Of Multimedia Data Over A Computer Network, by Mattaway et al., filed Sep. 25, 1996;

U.S. patent application Ser. No. 08/719,554, entitled Point-to-point Computer Network Communication Utility Utilizing Dynamically Assigned Network Protocol Addresses, by Mattaway et al., filed Sep. 25, 1996;

U.S. patent application Ser. No. 08/719,640, entitled Method And Apparatus For Dynamically Defining Data Communication Utilities, by Mattaway et al., filed Sep. 25, 1996;

U.S. patent application Ser. No. 08/719,898, entitled Method And Apparatus For Providing Caller Identification Based Out-going Messages In A Computer Telephony Environment, by Mattaway et al., filed Sep. 25, 1996;

U.S. patent application Ser. No. 08/718,911, entitled Method And Apparatus For Providing Caller Identification Based Call Blocking In A Computer Telephony Environment, by Mattaway et al., filed Sep. 25, 1996;

U.S. patent application Ser. No. 081719,639, entitled Method And Apparatus For Providing Caller Identification Responses In A Computer Telephony Environment, by Mattaway et al., filed Sep. 25, 1996; and U.S. patent application Ser. No. 08/832,746, entitled Virtual Circuit Switching Architecture, by Mattaway et al., filed Apr. 4, 1997;

U.S. patent application Ser. No. 08/911,133, entitled Method and Apparatus for Establishing Communications Between Packet-Switched and Circuit-Switched Networks, by Keith C. Kelly, filed Aug. 14, 1997;

U.S. patent application Ser. No. 08/911,519, entitled Domain Name Server Architecture for Translating Telephone Number Domain Names into Network Protocol Addresses, by Keith C. Kelly, filed Aug. 14, 1997; and U.S. patent application Ser. No. 08/914,714, entitled Automatic Call Distribution Server for Computer Telephony Communications, by Keith C. Kelly, filed Aug. 19, 1997.

FIELD OF THE INVENTION

The invention relates, generally, to data processing systems and telecommunication systems, and, more specifically, to a technique for for establishing communications from browser application.

BACKGROUND OF THE INVENTION

Searching for information available on global computer networks, i.e. "cruising the Web," particularly the worldwide web portion of the Internet has become popular recently. A number of commercially available software applications executable on a conventional computer architecture enable users to connect to the Internet through their respective Internet Service Provider and provide a graphic user interface and appropriate functionality for locating and exploring "websites". Such sites typically comprise a server operatively coupled to the Internet, the server having one or more "pages" which may be explored by a user using the browser application. Examples of such commercially available browsers include Netscape Navigator, version 2.0 and thereafter commercially available from Netscape Communications Corporation. Similar browser packages are commercially available from MicroSoft Corporation, Redmond, Washington.

The worldwide web and Internet, in general, have created a completely new venue in which to obtain information, purchase services and goods, etc. Accordingly, many vendors of products and services have established web sites containing information about products, services, etc., including "1-800" telephone numbers and Email addresses by which the vendor or source of information may be contacted. Due to the disparity between the architecture and addressing protocols utilized by traditional public switch telephone networks, i.e. a circuit-switched telephone network, and the Internet, i.e. a packet-switched data network, it has been previously difficult to establish a real-time communication link between a user exploring a website with a browser and an actual human operator. A brief description of the differences between the network types is set forth below for the benefit of the reader.

Two fundamentally different switching technologies exist that enable digital communications. The first type, circuit-switched networks, operate by establishing a dedicated connection or circuit between two points, similar to public switched telephone networks(PSTN). A telephone call causes a circuit to be established from the originating phone through the local switching office across trunk lines, to a remote switching office and finally to the intended destination telephone. While such circuit is in place, the call is guaranteed a data path for digitized or analog voice signals regardless of other network activity. The second type packet-switched networks, typically connect computers and establish an asynchronous "virtual" channel between two points. In a packet-switched network, data, such as a voice signal, is divided into small pieces called packets which are then multiplexed onto high capacity connections for transmission. Network hardware delivers packets to specific destinations where the packets are reassembled into the original data set. With packet-switched networks, multiple communications among different computers can proceed concurrently with the network connections shared by different pairs of computers concurrently communicating. Packet-switched networks are, however, sensitive to network capacity. If the network becomes overloaded, there is no guarantee that data will be timely delivered. Despite this drawback, packet-switched networks have become quite popular, particularly as part of the Internet and Intranets, due to their cost effectiveness and performance.

In a packet-switched data network one or more common network protocols hide the technological differences between individual portions of the network, making interconnection between portions of the network independent of the underlying hardware and/or software. A popular network protocol, the Transmission Control Protocol/Internet Protocol (TCP/IP) is utilized by the Internet and Intranets. Intranets are private networks such as Local Area Networks (LANs) and Wide Area Networks (WAN). The TCP/IP protocol utilizes universal addressing as well as a software protocol to map the universal addresses into low level machine addresses. For purposes of this discussion, networks which adhere to the TCP/IP protocol will be referred to hereinafter "IP-based" or as utilizing "IP addresses" or "Internet Protocol address".

It is desirable for communications originating from a PSTN network to terminate at equipment in an IP-based network, and vice versa. Problems arise, however, when a user on a circuit-switched network tries to establish a communication link to a packet-switched data network, and vice versa, due to the disparity in addressing techniques and architectural differences between the two types of networks. Accordingly, a user currently viewing page on a vendor's website has had to separately call the vendor using information posted on the website through a completely different network infrastructure, i.e. a public telephone network, or, communicate over the Internet in non-real time. With either technique, the results are often unsatisfactory and possibly effect the user's ability to obtain information or complete a transaction.

Accordingly, a need exists for the ability to establish a direct-to-point communication link from a software application on a packet-switched data network to a vendor or source of information, regardless of whether the vendor is reachable via the Internet or a public switched telephone network.

A further need exists for the ability to automatically launch and establish a communication link from a web browser to a web site or call distribution center associated with the website in a manner which substantially seamless to the browser user.

A further need exists for the ability to utilize information, such as Internet protocol addresses, telephone numbers, E-mail addresses and other information which may be posted on the Internet to efficiently establish a communication link between a software application, such as a browser, and a source posting of such information.

SUMMARY OF THE INVENTION

The present invention provides a method and system for establishing communications directly from the software application to a call recipient, whether the recipient is located on a packet-switched network or a circuit-switched network. Specifically, the present invention provides a method by which iconical or other graphical representations of a destination may be selected with a pointing device from a computer system and a call established between a browser user and a destination identified on a website. Even more specifically, address information, which may be implemented as an HTML tag graphically represented on the page of a website, is transmitted to the user of a web browser or other software application and utilized by a computer telephony application executing locally on the user system to establish a direct-to-point communication from the user to the destination indicated in the address information, thereby establishing a real-time point-to-point communication.

According to one aspect of the invention, a method for establishing communications between a browser utility and a remote address on a packet-switched data network or terminating apparatus on a circuit-switched communication network comprises the steps of receiving address information usable in establishing a communication connection with a destination, supplying the address information to a communication utility associated with the browser utility, and initiating a communication link to the destination utilizing the address information and the communication utility. According to various embodiments, the address information may comprise an electronic mail address, a network protocol address, or a telephone number. The address information may also be in the form of hypertext markup language (HTML). According to another embodiment, the step of receiving the address information comprises the step of selecting the address information with a pointing device from a graphic user interface associated with the browser utility.

In accordance with a second aspect of the invention, a computer program product usable with a computer system operatively coupled to a computer network comprises a computer usable medium having programming code embodied in the medium, the program code comprising program code configured to obtain address information about a destination from a source coupled to the computer system over a computer network, program code for establishing communications with the destination, program code for supplying the address information to the program code for establishing the communication connection, and program code for initiating execution of the program code for establishing a communication connection. The destination may comprise either a network address on a packet-switched data network or terminating apparatus on a circuit-switched communication network. In one embodiment, the computer program product further comprises program code responsive to user commands from a computer system pointing device for retrieving address information from a remote address operatively coupled to the computer system.

In accordance with a third aspect of the invention, a server apparatus, coupled to a computer network comprises a processor, a memory coupled to the processor, a network interface coupled to the process and the memory, address information stored in the memory, the address information identifying a destination, and a communication utility stored in the memory, the communication utility capable of being transmitted to other processes over the communication network. In one embodiment, the destination comprises either an address on a packet-switched data network or terminating apparatus on a circuit-switched communication network.

BRIEF DESCRIPTION OF THE DRAWINGS

The above and other features, objects, and advantages of the invention will be better understood by referring to the following description in conjunction with the accompanying drawing in which.

DETAILED DESCRIPTION

Figure 1:
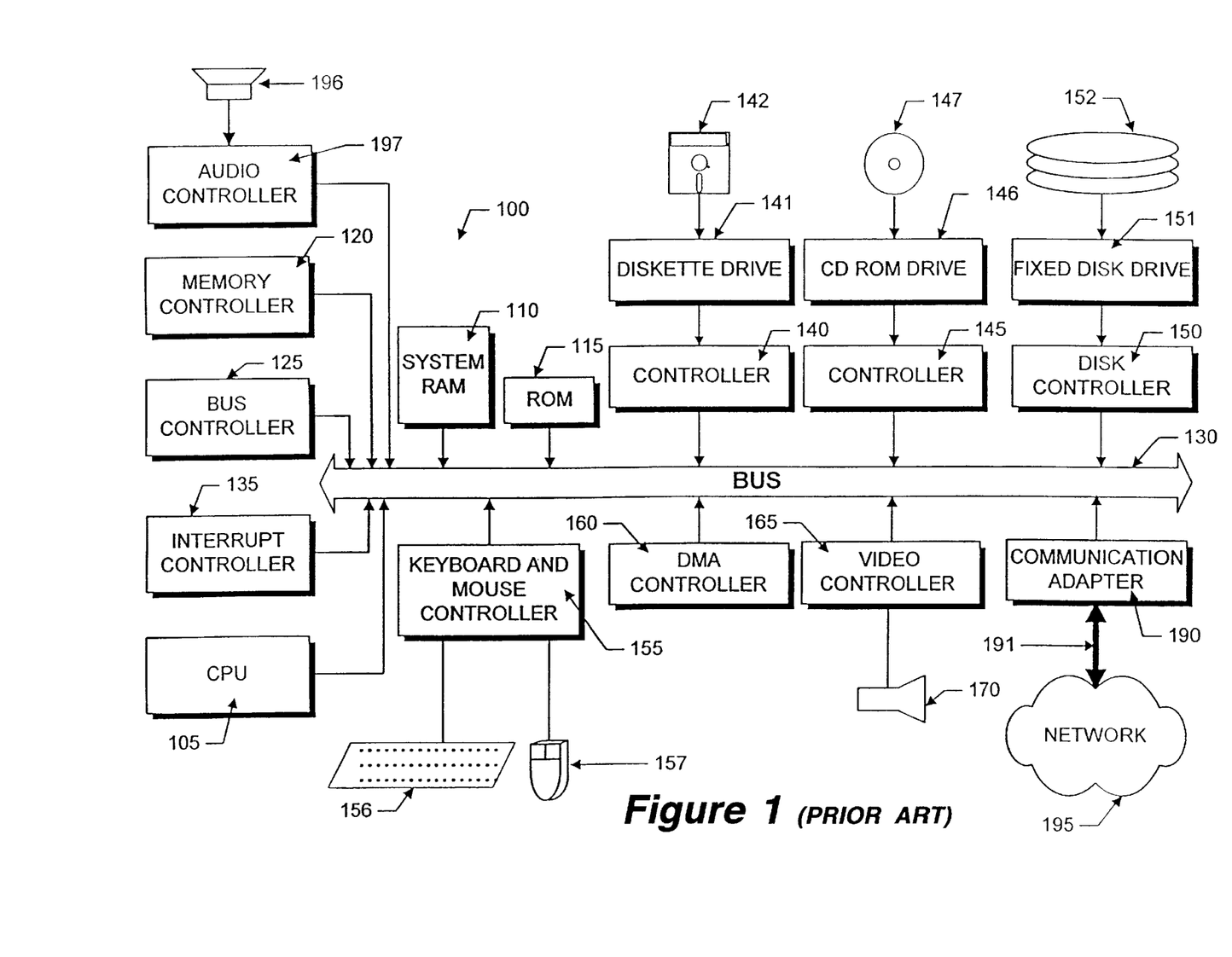
FIG. 1 is a block diagram of a computer systems suitable for use with the present invention.

FIG. 1 illustrates the system architecture for a computer system 100, such as an IBM PS/2® computer on which the invention can be implemented. The exemplary computer system of FIG. 1 is for descriptive purposes only. Although the description below may refer to terms commonly used in describing particular computer systems, such as an IBM PS/2 computer, the description and concepts equally apply to other systems, including systems having architectures dissimilar to FIG. 1.

The computer system 100 includes a central processing unit (CPU) 105, which may include a conventional microprocessor, a random access memory (RAM) 110 for temporary storage of information, and a read only memory (ROM) 115 for permanent storage of information. A memory controller 120 is provided for controlling system RAM 110. A bus controller 125 is provided for controlling bus 130, and an interrupt controller 135 is used for receiving and processing various interrupt signals from the other system components. Mass storage may be provided by diskette 142, CD ROM 147 or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices such as a pen and/or tablet and a microphone for voice input may be connected to computer system 100 through bus 130 and an appropriate controller/software. DNA controller 160 is provided for performing direct memory access to system RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Figure 2A:
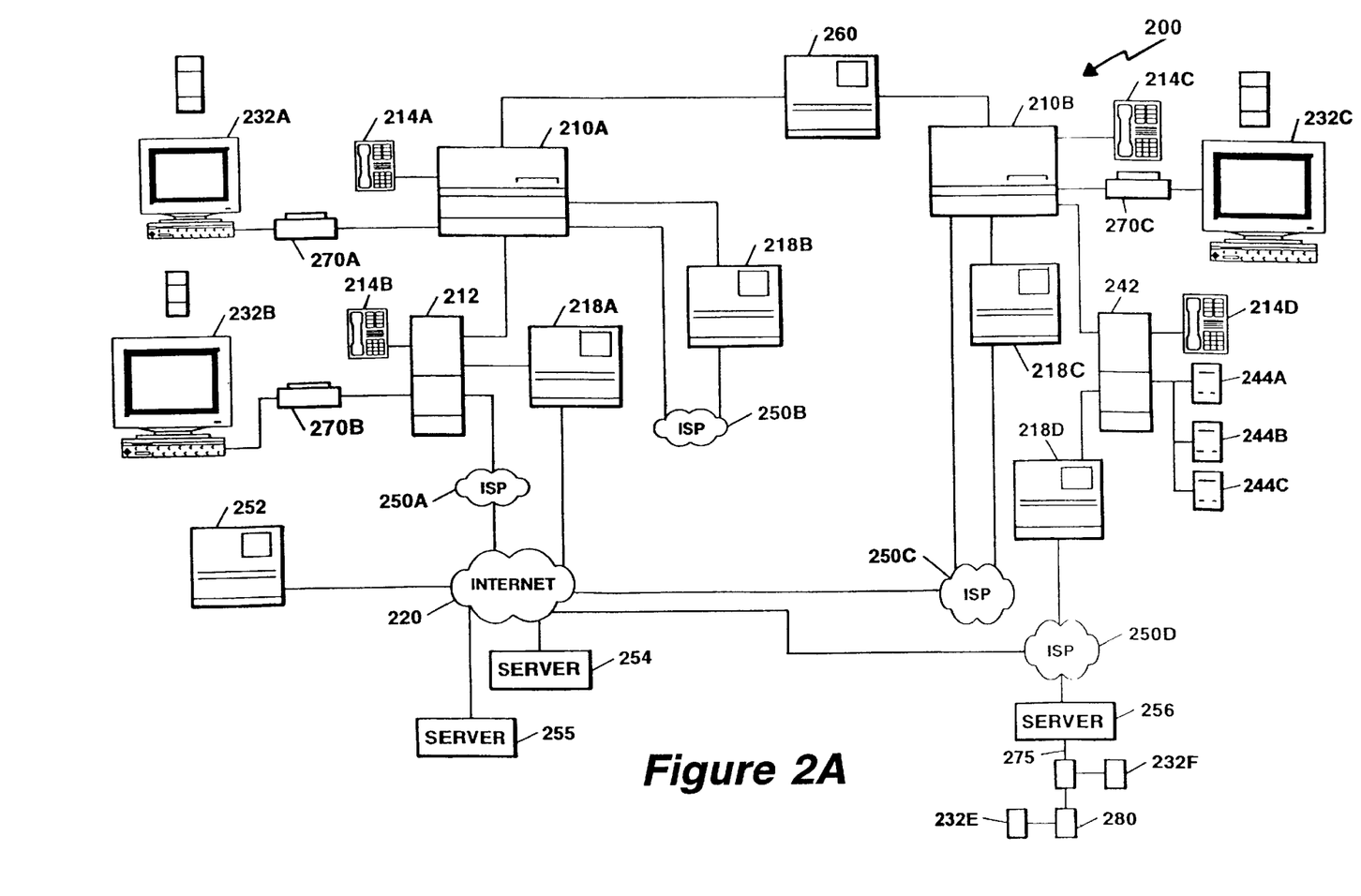
FIG. 2A is a conceptual illustration of a communications network environment in which the present invention may be utilized.

Computer system 100 is generally controlled and coordinated by operating system software, such the OS/2200 operating system, available from International Business Machines Corporation, Armonk, N.Y. or Windows NT operating system, available from MicroSoft Corporation, Redmond, Wa. The operating system controls allocation of system resources and performs tasks such as process scheduling, memory management, and networking and I/O services, among other things. The present invention is intended for use with a multitasking operating system, such as those described above which are capable of simultaneous multiple threads of execution. For purposes of this disclosure a thread can be thought of as a "program" having an instruction or sequence of instructions and a program counter dedicated to the thread. An operating system capable of executing multiple threads simultaneously, therefore, is capable of performing multiple programs simultaneously.
Telecommunication Environment FIG. 2 illustrates a telecommunications environment in which the invention may be practiced such environment being for exemplary purposes only and not to be considered limiting. Network 200 of FIG. 2 illustrates a hybrid telecommunication environment including both a traditional public switched telephone network as well as Internet and Intranet networks and apparatus bridging between the two. The elements illustrated in FIG. 2 are to facilitate an understanding of the invention. Not every element illustrated in FIG. 2 or described herein is necessary for the implementation or the operation of the invention.

A pair of PSTN central offices 210A–B serve to operatively couple various terminating apparatus through either a circuit switched network or a packet switched network. Specifically, central offices 210A–B are interconnected by a toll network 260. Toll network 260 may be implemented as a traditional PSTN network including all of the physical elements including routers, trunk lines, fiber optic cables, etc. Connected to central office 210A is a traditional telephone terminating apparatus 214 and an Internet telephone 232A. Terminating apparatus 214 may be implemented with either a digital or analog telephone or any other apparatus capable of receiving a call such as modems, facsimile machines, etc., such apparatus being referred to collectively hereinafter as a terminating apparatus, whether the network actually terminates. Further, the PSTN network may be implemented as either an integrated services digital network (ISDN) or a plain old telephone service (POTS) network. The Internet telephony is conceptually illustrated as a telephone icon symbolizing the Internet telephone client application executing on a personal computer and interconnected to central office 210A via a modem 270A. Similarly, telephone 214C is connected to central office 210D and WebPhone 232C is connected to central office 210B via modem 270C. Central offices 210A–B are, in turn, operatively coupled to Internet 220 by SP 250B and 250C, respectively. In addition, central office 210A is coupled to ISP250B by gateway 218B. Similarly, central office 210B is connected to ISP 250C by gateway 218C. In addition, a telephone 214B and Internet telephone 232B, similar to telephone 214A and Internet telephone 232A, respectively, are interconnected to Internet 220 via PBX 212, gateway 218A and ISP 258A. In addition, global server 252 is coupled to the Internet 220 are a domain name system server 254 and 255. Global server 252 may be implemented as described in U.S. Patent Application No. 081719,894, entitled Directory Server for Providing Dynamically Assigned Network Protocol Addresses, previously referenced and incorporated herein. A global server suitable for use as Global Server 252 is commercially available from NetSpeak Corporation in the form of a collection of intelligent software modules including connection server Part No. CSR1, information server, Model ISR1, and database server, Model DBSR1. Name servers 254 and 255 are described as set forth hereinafter. Finally, Internet Service Providers (ISPs) 250A–D may comprise any number of currently commercially available Internet service providers such as America On Line, the IBM Global Network, etc. An Intranet implemented as LAN 275 is coupled to Internet 220 via ISP 250D and server 256. Server 256 may have the architecture as illustrated in FIG. 1 and functions as a proxy server for LAN 275 to which WebPhone 232E is connected via a LAN-based TCP/IP network connector 280. A plurality of Internet telephone 232F and 232E are coupled to LAN 275 via LAN connectors 280. The gateways and Internet telephony client applications may be implemented as set forth in greater detail hereinafter.
WebPhone Client Internet telephone 232 may be implemented as described in the previously referenced U.S. patent applications incorporated herein by reference. An Internet telephony application suitable for use with the present invention is the WebPhone 1.0, 2.0 or 3.0, client software application commercially available from NetSpeak Corporation, Boca Raton, Florida, referred to hereafter as the WebPhone client or WebPhone process. For the remainder of this description, the Internet telephone will be referred to as the WebPhone client. It will be obvious to those reasonably skilled in the arts that other Internet telephone applications implementing similar functionality may be substituted for the WebPhone client without affecting the inventive concepts contained herein. The WebPhone client comprises a collection of intelligent software modules which perform a broad range of Internet telephony functions. For the purpose of this disclosure, a "virtual" WebPhone client refers to the same functionality embodied in the WebPhone client application without a graphic user interface. Such virtual WebPhone client can be embedded into a gateway, automatic call distribution, server, or other apparatus which do not require extensive visual input/output from a user and may interact with any other WebPhone clients or servers adhering to the WebPhone protocol. For the purpose of this disclosure, WebPhone client 232 or any of the virtual WebPhone clients may be implemented in other apparatus, may be considered WebPhone client applications, "WebPhone Clients".

The WebPhone software applications may run on the computer system described with reference to FIG. 1, or a similar architecture whether implemented as a personal computer or dedicated server. In such an environment, the sound card 197 accompanying the computer system 100 of FIG. 1, may be an MCI compliant sound card while communication controller 190 may be implemented through either an analog modem 270 or a LAN-based TCP/IP network connector 280 to enable Internet/intranet connectivity.

The WebPhone clients, as well as any other apparatus having a virtual webPhone embodied therein, each have their own unique E-mail address and adhere to the WebPhone Protocol and packet definitions, as extensively described in the previously referenced related U.S. patent applications. For the reader's benefit, short summary of a portion of the WebPhone Protocol is set forth to illustrate the interaction of WebPhone clients with each other and the connection/information server 252 when establishing a communication connection.

Each WebPhone client, may serve either as a calling party or a caller party, i.e. the party being called. The calling party transmits an on-line request packet to a connection/information server upon connection to an IP-based network, e.g. the Internet or an Intranet. The on-line request packet contains configuration and settings information, a unique E-mail address and a fixed or dynamically assigned IP address for the WebPhone client. The callee party, also; a utilizing a WebPhone client, transmits a similar on-line request packet containing its respective configuration and setting information, E-mail address and IP address to the same or a different connection server upon connection to an IP-based network. The calling party originates a call by locating the callee party in a directory associated with either its own WebPhone client or the connection/information server to which it is connected. The callee party may be identified by alias, E-mail address or key word search criteria. Once the E-mail address of the calling party is identified, the calling party's WebPhone forwards a request packet to the connection/information server, the request packet containing the callee party's E-mail address. The connection/information server uses the E-mail address in the received request packet to locate the last known IP address assigned to the callee party. The connection/information server then transmits to the calling party an information packet containing the IP address of the callee party. Upon receipt of the located IP address from the connection server, the calling party's WebPhone client initiates a direct point-to-point communication link with the callee party by sending a call packet directly to the IP address of the callee party. The callee party either accepts or rejects the call with appropriate response packets. If the call is accepted, a communication session is established directly between the caller and the callee, without intervention of the connection/information server. The above scenario describes establishment of a communication link which originates and terminates with clients on an IP-based network.

To facilitate interaction with WebPhone clients, a virtual WebPhone is implemented in the gateway 218, either executable in RAM memory or embedded in ROM memory associated with such apparatus. The gateway 218 comprises a virtual WebPhone client which acts as a proxy device and voice processing hardware that bridges from an IP-based network to a PSTN network. The gateway 218 may be implemented with either a microprocessor based architecture or with dedicated digital signal processing logic and embedded software. A gateway suitable for use as gateway 218 with the present invention is either NetSpeak Model Nos. WGX-MD/24, a 24-port digital T-1 IP telephony gateway, or WGX-M/16, a 16-port analog IP telephony gateway, both commercially available from NetSpeak Corporation, Boca Raton, Fl. Gateway 218 is described in greater detail with reference to FIG. 3 hereinafter.

One of the capabilities of the gateway 218 is to bridge between the PSTN and Internet/intranet, and the Interne/Intranet and the PSTN. Gateway 218 virtualizes the PSTN call, making it appear as just another WebPhone client call. This virtual WebPhone process interfaces with ACD server 242 so that incoming PSTN calls can be routed to agent WebPhone processes with the tracking, distribution, and monitoring features of the ACD server 2424, as described hereinafter. For incoming calls originating on a PSTN, gateway 218 provides to ACD server 242 information about incoming calls so that proper call routing can ensue, such information possibly comprising Caller ID (CLID), automatic number identification (ANI), DNIS, PBX trunk information, from the central office 210, or other information collected by voice response units.

A communication link over a packet-switched network may be established with the network illustrated in FIG. 2A, using the WebPhone protocol as disclosed in U.S. patent application Ser. No. 08/533,115 entitled "POINT-TO-POINT INTERNET PROTOCOL" by Glenn W. Hutton, filed Sep. 25, 1995, previously incorporated herein by reference. Specifically, WebPhone 232A may connect to Internet 220 through central office 210A, ISP 250B and register with global server 252, notifying server 252 of its current dynamically signed Internet protocol address. Subsequently, WebPhone client 232A may inquire as to the current Internet protocol address of another WebPhone client, for example, WebPhone client 232C. If WebPhone client 252 is currently connected to the Internet and has likewise registered with the global server 252 will return the Internet protocol address of WebPhone 232C to WebPhone 232A. WebPhone client 232A may then establish a direct connection to WebPhone client 232C via central office 210A, ISP 250B, Internet 220, ISP 250C, and central office 210B. Alternatively, a point-to-point connection over a packet-switched network may be established over a local area network 275 by means of a direct connection from WebPhone clients 232E to 232F, such connection being possible if the Internet protocol addresses of the respective WebPhones are fixed.

Figure 2B:
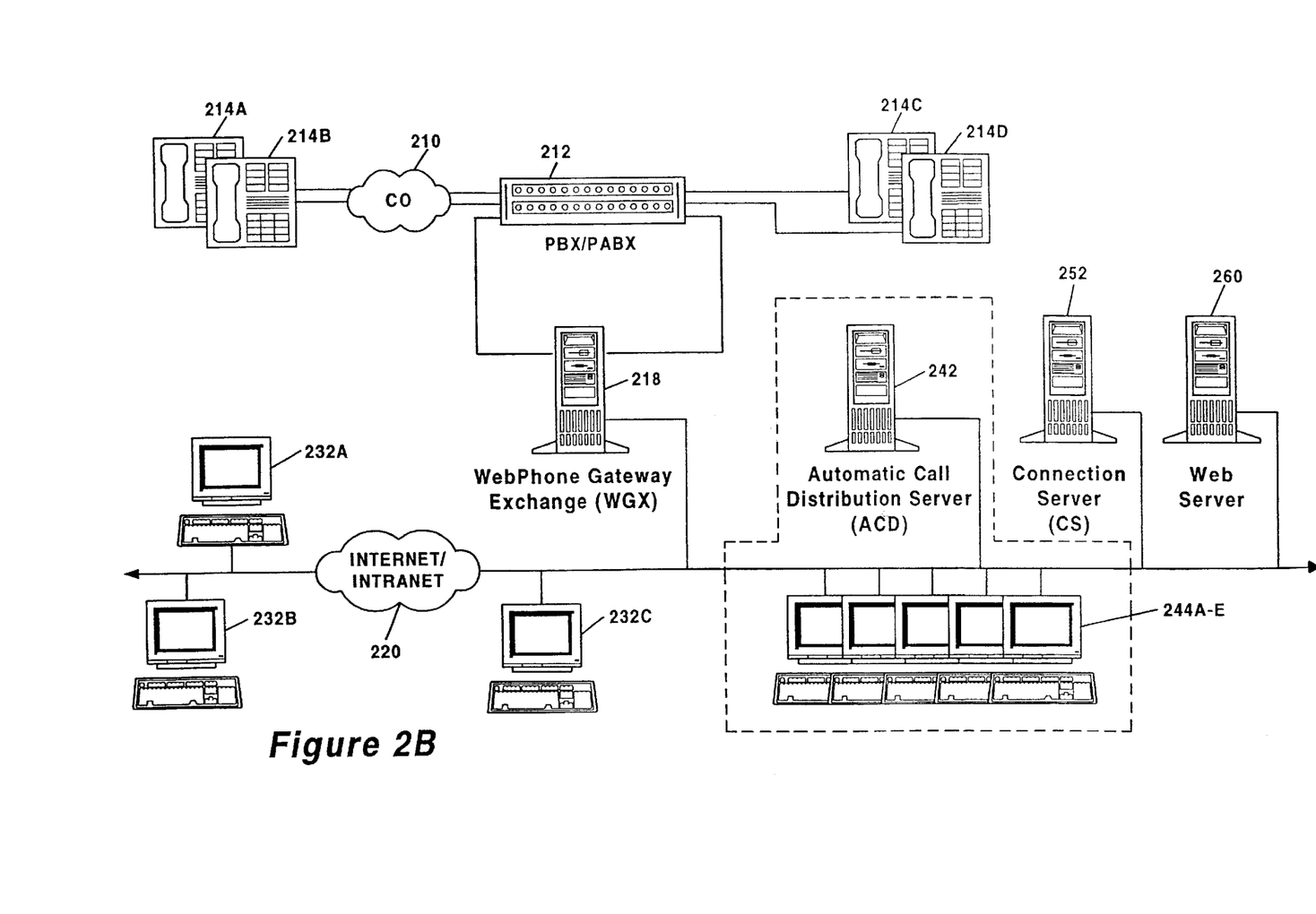
FIG. 2B is a conceptual block diagram of a simplified communication environment in which the present invention may be utilized.

Having explained the telecommunication environment and a number of possible interactions between terminating apparatus on a circuit-switched network and executing tasks on a packet-switched network, a simplified telecommunication environment is illustrated in FIG. 2B to facilitate an understanding of the invention. Where possible, the same reference numbers are utilized in FIG. 2B as in FIG. 2A.

Referring to FIG. 2B, a pair of terminating apparatus 214A–B are coupled to a public switched telephone network central carrier office 210 which is, in turn, coupled to a public branch exchange/public access branch exchange (PBX/PABX) 212, in a manner as previously described with reference to FIG. 2A. A second pair of terminating apparatus, i.e. telephones 214C–D, are connected directly to PBX/PABX 212, as illustrated. PBX/PABX 212 is coupled to a gateway 218 which is, in turn, coupled to a packet-switched data network, illustrated as Inteme/Intranet 220. Coupled to network 220 are automatic call distribution server 242, a connection server 252, one or more caller WebPhone client processes 232 and one or more agent WebPhone client processes 244A–F. Gateway 218, connection server 252, Internet 220, and WebPhone clients 232 and 244 have the structure and functionality as previously described herein or as referenced in copending application.

Automatic call distribution server 242 and agent WebPhones 244A–E collectively comprise the virtual automatic call distribution system the structure and function of which is described in the previously referenced copending patent application entitled AUTOMATIC CALL DISTRIBUTION SERVER FOR COMPUTER TELEPHONY COMMUNICATIONS by Keith C. Kelly, filed Aug. 19, 1997.

One or more of the WebPhone client processes 232A–C, in the illustrative embodiment, also have executing on the same system a browser application which may be any number of commercially-available web browser applications as previously described. Such browser applications are capable of supplying to the WebPhone client process any address information, such as network protocol addresses, E-mail addresses, or traditional PSTN telephone numbers. In addition, in accordance with the illustrative embodiment, the previously mentioned commercial browsers have been modified, or an appropriate macro routine written, to enable launching of the WebPhone client process from the browser upon receipt of such address information or user instructions.

A web server 260 is further connected to Internet/intranet 220, as illustrated in FIG. 2B. Web server 260 may be implemented on any number of commercially-available server architectures. Web server is accessible over a packet-switched data network, such as the Internetlintranet 220 and retains in memory thereof one or more "pages" which collectively may comprise a website used to visually present the information on the pages. One or more of the pages accessible on web server 260 may contain address information in the form of a hypertext markup language (HTML) tag which may be downloaded over the Internet 220 to a browser process executing on any of the systems executing WebPhone client 232. Such HTML tag may include the IP address or E-mail address of automatic call distribution server, such as ACD 242, associated with the website.

Figure 3:
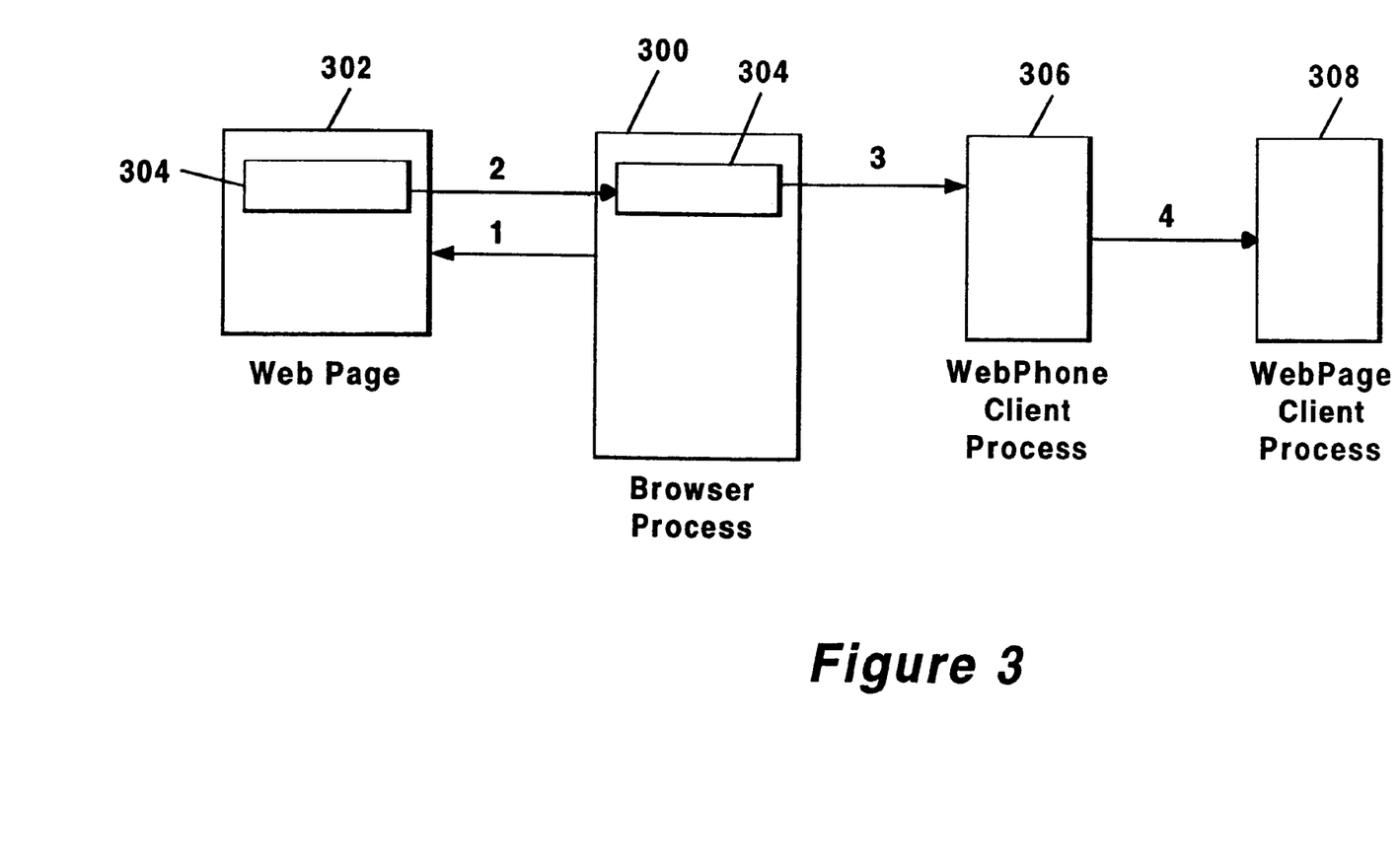
FIG. 3 is a conceptual illustration of the relationship between various processes in accordance with the present invention.

FIG. 3 illustrates conceptually the inventive process of the present invention. First, a browser utility process 300 executing on one of the same computer systems as WebPhone client 232 of FIG. 2B accesses a webpage 302 residing on web server 260 of FIG. 2B, as illustrated by step 1. Contained on webpage 302 is address information, i.e. an Internet protocol address, an E-mail address or a telephone number, or other information which may be stored in any number of forms including an HTML tag. The address information is selected by the user of browser process 300, typically with a pointing device by clicking a graphic representation of the data on the webpage, as illustrated by step 2. The address information is then supplied to WebPhone client process 306, as illustrated by step 3. If the WebPhone client process is already executing, the browser process 300 does not need to launch the WebPhone client process, otherwise the process 300 launches the WebPhone client process. Having obtained the address information, the WebPhone client process 306, upon instruction from the user or automatically upon receipt of the address information from browser process 300, attempts to establish a direct, point-to-point communication with a destination specified by the address information, as illustraded by step 4. In FIG. 3, such destination is illustrated as a second WebPhone client process 308. The establishment of a communication link from one WebPhone client process to another WebPhone client process is defined in great detail in the previously referenced copending applications. If the address information is an Internet protocol address, having the form XXX.XXX.XXX, the WebPhone client process 306 will attempt to establish a call directly to WebPhone client process 308. If the address information comprises an E-mail address, WebPhone client process 306 may first attempt to search the local directory associated with the WebPhone client process for a corresponding Internet protocol address. If not found, WebPhone client process 306 will attempt to connect with connection/information server 252 of FIG. 2B to obtain the corresonding dynamically assigned Internet protocol address associated with the E-mail address. In such instance, WebPhone client process 306 supplies the E-mail address in packetized form to connection server 252. In response, if the process identified by the E-mail address is currently online and has a currently assigned Internet protocol address, connection server 252 will supply the Internet protocol address back to WebPhone client process 306 in packetized form. WebPhone client process 306 will then attempt to establish a connection to the second WebPhone client process 308 in a manner previously described. WebPhone client process 308 may be implemented as any process adhering to the WebPhone protocol, including an automatic call distribution system 242, a connection server 252, a gateway 218, etc.

If the address information obtained by browser process 300 comprises a traditional PSTN telephone number, WebPhone client process 306 will supply the telephone number to connection server 252 of FIG. 2B. In one embodiment, connection server 252 recognizes the information as a telephone number and, using a look-up table algorithm matches a portion of the telephone number, such as the country code, area code or exchange, to an IP address representing a gateway which can establish a call over a circuit-switched network to the terminating apparatus represented by the telephone number. Such IP address is then returned to WebPhone client process 306. WebPhone client 306 then attempts to contact the gateway, e. g. gateway 218. In the illustrative embodiment, gateway 218 implements the WebPhone protocol and is capable of functioning as a WebPhone client process without a graphic user interface. In a manner previously described, gateway 218 then establishes a traditional call to the terminating apparatus specified by the telephone number and performs the functions of translating either analog or digital telephone signals to compressed packetized audio packets, and vice versa to effect communication between the WebPhone client process and the terminating apparatus, i.e., a telephone 214.

Alternatively, the telephone number may be supplied from WebPhone client process 306 to a domain name server which then resolves the telephone number into the Internet protocol address of the appropriate gateway, in a manner described in U.S. patent application Ser. No. 08/911,133, entitled Method and Apparatus for Establishing Communications Between Packet-Switched and Circuit-Switched Networks, by Keith C. Kelly, filed Aug. 14, 1997, and U.S. patent application Ser. No. 08/911,519, entitled Domain Name Server Architecture for Translating Telephone Number Domain Names into Network Protocol Addresses, by Keith C. Kelly, filed Aug. 14, 1997. The IP address is then returned to WebPhone client process 306 which then contacts the gateway represented by the IP address directly to establish the call to the terminating apparatus on the TSTN network, in the manner described above.

Utilizing the method described above, a user of a web browser utility may single click on an icon representing an HTML tag on a web page and, using the technique described herein seamlessly establish a real-time communication with either an automatic call distribution center associated with the website over a packet-switched data network or with a traditional automatic call distribution system over a telephone line.

In the event that the user does not have a copy of a WebPhone client application loaded onto their respective system on which the browser is currently executing, the web server 260 may have available downloadable copies of the WebPhone client application in the contemplated embodiment. As part of the website, the user may be prompted to download a copy of the WebPhone client application. Once loaded onto a user system, the process of establishing the communication may occur as previously described.

In accordance with a second aspect of the invention, the WebPhone client procerss and the WebPhone protocol implements packets for exchanging uniform resource locator (URL) data which may be shared among parties to a call to allow the parties to view the same pages on a web server while maintaining a real-time communication.

In another embodiment, a web server 260 is implemented to set up a call file whenever a user visits the website with a browser utility. The call file may record such data as the pages visited, information entered in response to prompts from the website and identifiers of products or services which interest the browser. The address information described previously may be copied into the call file by default. Upon selecting the address information, the user is transmitted the complete call file along with the address information which is supplied by the browser to the WebPhone client process. Upon establishing a communication connection with the destination specified by the address information, the call file is transmitted, in packetized form, to the destination, e.g., a WebPhone agent at an automatic call distribution center. The operator may then utilize the information contained within the call file to service the request of the browser user.

A software implementation of the above-described embodiments may comprise a series of computer instructions either fixed on a tangible medium, such as a computer readable media, e.g. diskette 142, CD-ROM 147, ROM 115, or fixed disk 152 of FIG. 1A, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. Further, many of the system components described herein such as the client application and the gateway have been described using products from NetSpeak Corporation. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Such modifications to the inventive concept are intended to be covered by the appended claims.

What is claimed is:

1. A method for establishing real-time audio communications between a process executing on a computer system coupled to a packet-switched network and an information source coupled to either a packet-switched data network or terminating apparatus on a circuit-switched communication network, the method comprising:

A. retrieving, with a browser process executing on the computer system, address information usable in establishing a real-time audio communication connection with a destination;

B. supplying the address information from the browser process to a computer telephony communication utility associated with the browser process; and C. initiating with the computer telephony communication utility a real-time audio communication connection with the destination identified by the address information.

2. The method of claim 1 wherein the address information comprises an electronic mail address.

3. The method of claim 1 wherein the address information comprises a network protocol address.

4. The method of claim 3 wherein the network protocol address comprises an Internet Protocol address.

5. The method of claim 1 wherein the address information comprises a telephone number.

6. The method of claim I wherein the address information is in the form of hypertext markup language (HTML).

7. The method of claim 1 wherein the address information is associated with the destination and step A further comprises:

A.1 selecting the address information with the browser process.

8. The method of claim 7 wherein step A.1 further comprises:

A.1.1 selecting the address information with a pointing device from a user interface associated with the browser process.

9. The method of claim 1 wherein step B comprises:

B.1 supplying the address information to a communication utility executable on the computer system as the browser process, the communication utility responsive to the browser utility.

10. The method of claim 1 wherein step B further comprises:

B.1 receiving an executable copy of the communication utility, the communication utility responsive to the browser utility.

11. The method of claim 1 wherein step C further comprises:

C.1 supplying the address information to the communication utility; and

C.2 initiating a communication link from the communication utility to the destination specified by the communication information.

12. The method of claim 1 further comprising:

D. establishing a communication link with the destination designated by the address information.

13. The method of claim 12 wherein the address information comprises an Internet Protocol address and step D further comprises:

D.1 establishing a communication link with the network protocol address specified in the address information.

14. The method of claim 12 wherein the address information specifies an electronic mail address and wherein step D further comprises:

D.1 obtaining a network protocol address associated with the electronic mail address specified in the address information; and D.2 establishing a communication link with the network protocol address associated with the E-mail address.

15. The method of claim 14 wherein step D.1 further comprises:

D.1.1 searching a directory for the network protocol address associated with the electronic mail address.

16. The method of claim 12 wherein the address information comprises a telephone number and step D comprises:

D.1 establishing a communication link with a gateway capable of communicating with the terminating apparatus specified by the telephone number.

17. The method of claim 16 wherein step D.1 comprises:

D.1.1 resolving the telephone number into a network protocol address; and

D.1.2 using the network protocol address to contact the gateway.

18. A computer program for use with a computer system operatively coupled to a computer network, the computer system capable of executing one or more processes, the computer program comprising a computer usable medium having computer readable program code embodied in the medium, the program code comprising:

A. browser program code configured to obtain address information usable in establishing a real-time audio communication connection with a destination;

B. computer telephony program code for establishing a real-time audio communication connection with the destination, the destination comprising an address on a packet-switched network or terminating apparatus on a circuit-switched communication network;

C. program code, responsive to the browser program code, for supplying to the computer telephony program code the address information; and D. program code for initiating execution of the computer telephony program code for establishing a real-time audio communication connection with the destination specified by the address information.

19. The computer program product of claim 18 further comprising:

program code configured to provide a visual presentation of information obtained over the computer network.

20. The computer program product of claim 19 further comprising:

program code, responsive to user commands from a computer system pointing device, for retrieving address information from a remote address operatively coupled to the computer system.

* * * * *